United States Patent [19]

Ito et al.

[11] 4,431,310

[45] Feb. 14, 1984

[54] METHOD OF PREPARING KNEADED COMPOSITIONS

[75] Inventors: Yasuro Ito; Yoshiro Higuchi, both of Tokyo; Masanori Tsuji, Osaka; Hideharu Kaga, Tokyo; Yasuhiro Yamamoto, Kawasaki; Kenji Kuroha, Tokyo; Norio Marushima, Ichikawa; Mitsutaka Hayakawa, Kamakura; Eiichi Tazawa, Tokyo; Yasunori Matsuoka, Yokohama; Seiji Kaneko, Kamakura, all of Japan

[73] Assignee: Yosuro Ito and Taisei Corporation, Tokyo, Japan

[21] Appl. No.: 326,056

[22] Filed: Nov. 30, 1981

[30] Foreign Application Priority Data

Sep. 30, 1981 [JP] Japan ................. 56-153974
Oct. 23, 1981 [JP] Japan ................. 56-168531
Oct. 23, 1981 [JP] Japan ................. 56-168532

[51] Int. Cl.³ .............................. B01F 3/12
[52] U.S. Cl. ............................. 366/8; 366/18; 366/30; 366/40

[58] Field of Search ............... 106/76, 97, 100, 237, 106/281, 314, 89 T; 366/2, 5, 6, 8, 14, 27, 30, 34, 40, 42, 43, 150, 154

[56] References Cited

U.S. PATENT DOCUMENTS

| 2,703,703 | 3/1955 | Nargelovic ............. 366/15 |
| 3,230,589 | 1/1966 | McIlvaine .............. 366/8 |
| 3,669,418 | 6/1972 | Cornwell et al. ........ 366/5 |
| 4,335,966 | 6/1982 | Rapp et al. ............. 366/2 |

Primary Examiner—Robert W. Jenkins
Assistant Examiner—Arthur D. Dahlberg
Attorney, Agent, or Firm—Birch, Stewart, Kolasch and Birch

[57] ABSTRACT

In the preparation of a cement paste about 30 to 76% of the total water is added to the cement to form a funicular state, capillary state or slurry state, and the resulting mixture is kneaded so as to reduce the coagulated lumps of cement. Then the remaining quantity of water is added and the composition or mixture is kneaded again. Sand and/or gravel may be incorporated after the firstly kneaded mixture. The resulting cement paste, mortar or green concrete exhibits a small percentage of bleeding water and products prepared therefrom have a high compression strength.

16 Claims, 17 Drawing Figures

TIME ELAPSED (HOUR)

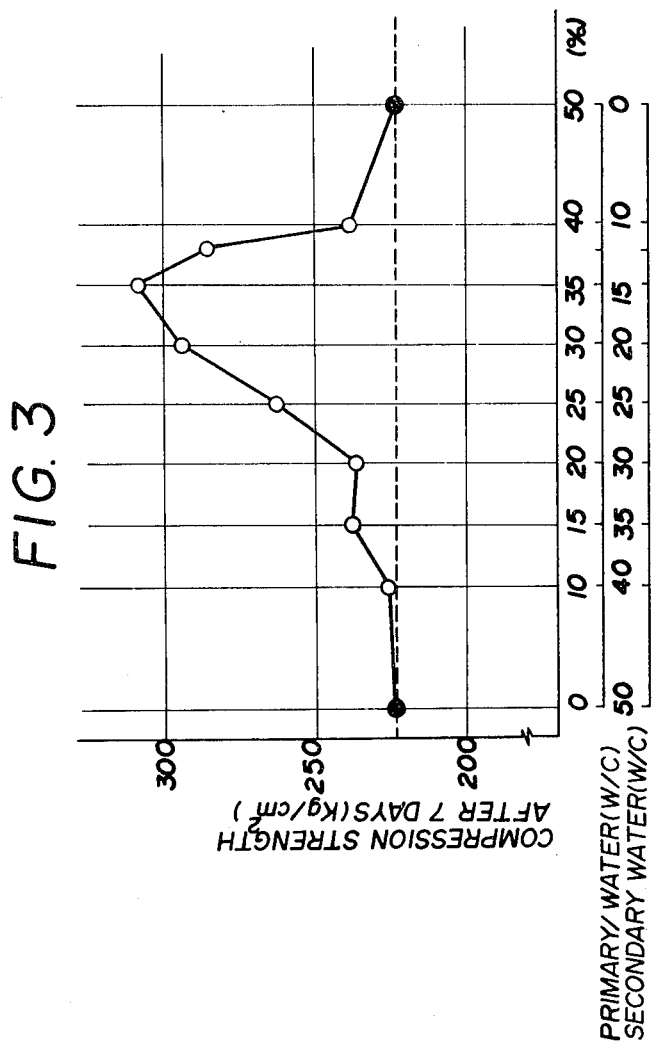

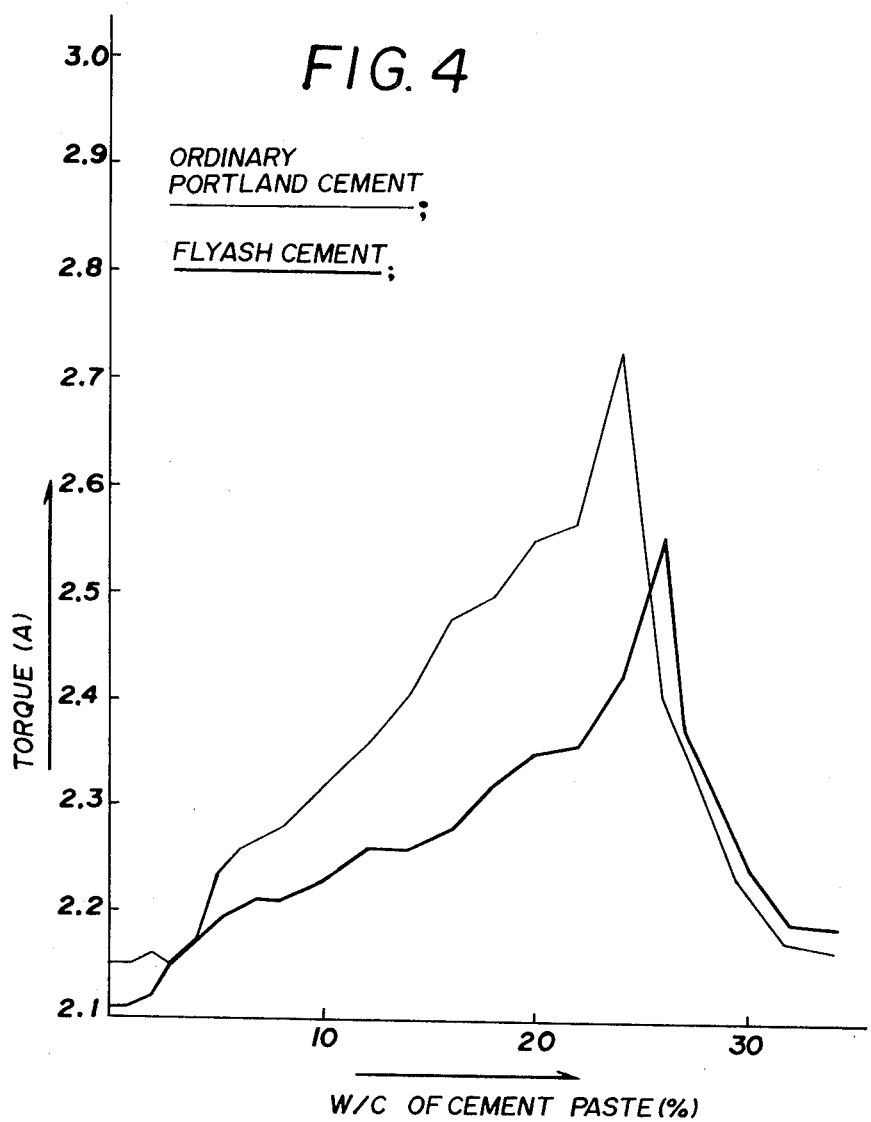

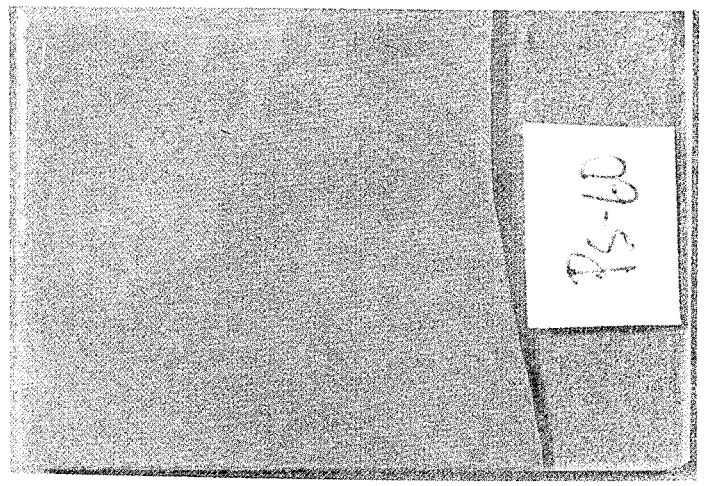
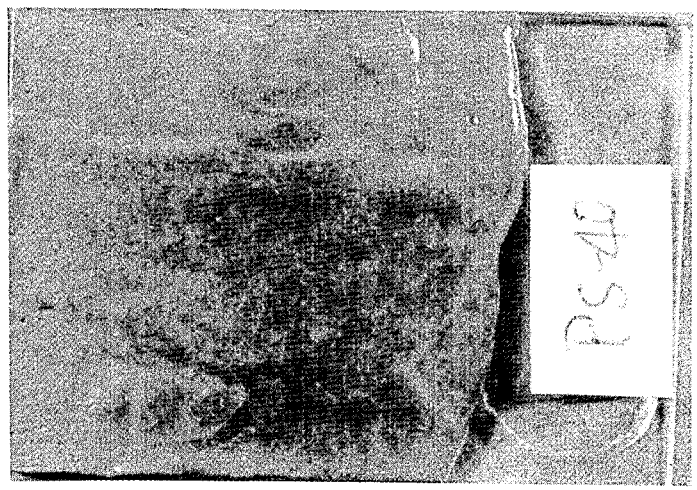
FIG. 7 (a)

(b)

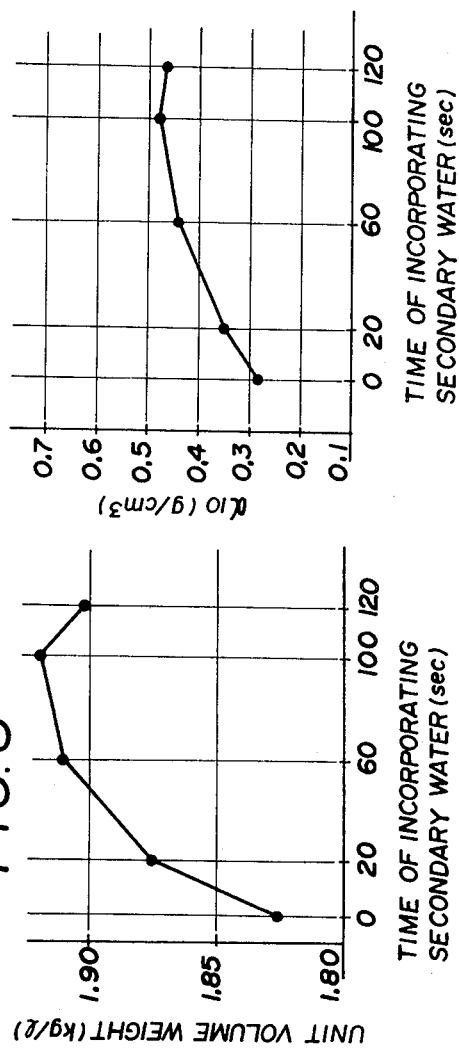

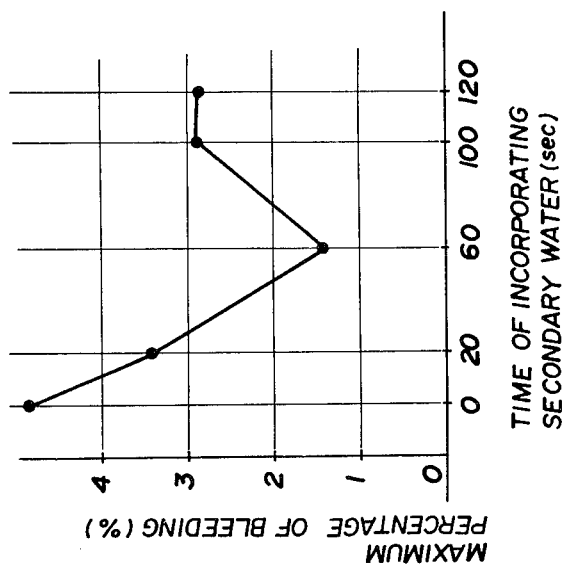
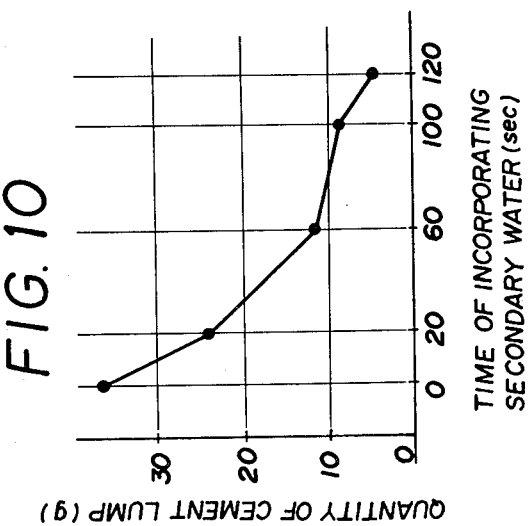

METHOD OF PREPARING KNEADED COMPOSITIONS

BACKGROUND OF THE INVENTION

This invention relates to a method of preparing a kneaded composition by using a powder of a hydraulic substance as cement.

Although any hydraulic substance for example, plaster and various kinds of cement, can be used, since Portland cement is most widely used in various civil works and in constructing buildings as precast products or blasing or pouring in the form of a paste, mortar or green concrete, in the following description and the appended claims the term cement is used to include any hydraulic substance that can be used for working out the method of this invention.

To prepare a cement paste, mortar or green concrete, a suitable quantity of water is added to a powder of cement and the mixture is then kneaded. Usually at least 90% (in the following description, in most cases, percentage is weight percent) of the total quantity of water is first added to cement and the remaining quantity of the water is added at the final stage of kneading. With such a prior art method, however, a substantial quantity of water bleeds out when the kneaded compound is cast or shaped into a desired product. Moreover, the mechanical strength of the product is not always high and uniform. In the past, it has been considered that such defects were inevitable for cement or concrete products, and a substantial bleeding time was used to finish the surface of products or to determine the percentage of ingredients or to design the concrete products and use mortar or concrete by taking into consideration such bleeding time. Although many attempts have been made, it has been impossible to completely eliminate the defects described above.

SUMMARY OF THE INVENTION

Accordingly, it is the principal object of this invention to provide an improved method of preparing a kneaded composition of cement capable of reducing the quantity of the bleeding water and a method of producing mortar or concrete products having excellent mechanical strength.

According to this invention there is provided a method of preparing a kneaded composition comprising the steps of incorporating a primary water into a powder of hydraulic substance in a quantity to form a funicular, capillary or slurry state close to the capillary state, subjecting the resulting mixture to a first kneading operation so as to decrease coagulated lumps of the powder; adding secondary water to the kneaded mixture in a quantity necessary to establish a predetermined water to cement ratio and subjecting the resulting mixture to a second kneading operation.

The quantity of the primary water is selected to be from 30 to 76% of the total quantity of water necessary to prepare the paste or green concrete. Aggregate such as sand and gravel is preferably incorporated between the first and second kneading operations. The quantity of the secondary water is determined by taking into consideration the quantity of water contained in the aggregate.

BRIEF DESCRIPTION OF THE DRAWINGS

Further objects and advantages of the invention can be more fully understood from the following detailed description taken in conjunction with the accompanying drawings in which:

FIG. 3 is a graph showing the compression strength of the product made of cement pastes prepared according to a prior art method and the method of this invention;

FIG. 4 is a graph showing the relationship between the water to cement ratio and the torque required for kneading a cement paste;

FIG. 8 is a graph showing the relationship between the unit volume weight of a cement paste and the time of incorporating the secondary water;

FIG. 9 is a graph showing the relationship between the degree of cylinder penetration and the time of incorporating the secondary water;

FIG. 10 is a graph showing the relationship between the quantity of cement lumps and the time of incorporating the secondary water;

FIG. 11 is a graph showing the relationship between the percentage of bleeding and the time of incorporation of the secondary water of a cement paste;

DESCRIPTION OF THE PREFERRED EMBODIMENTS

Figure 1:
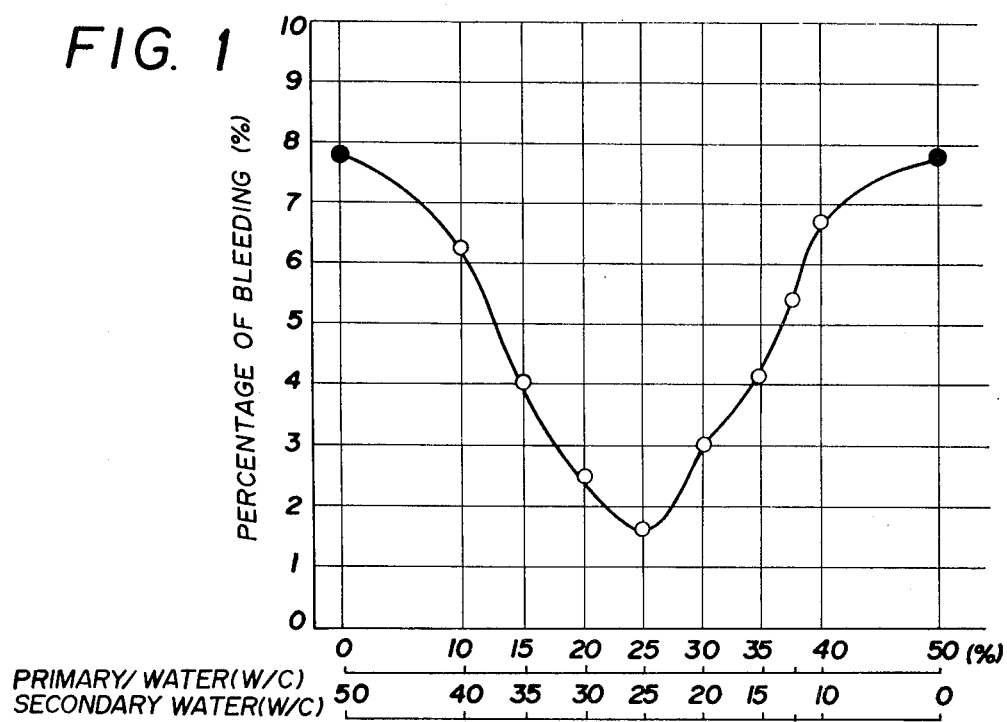
FIG. 1 is a graph showing the result of measurement of the percentage of bleeding of a cement paste utilizing Portland cement at a constant water to cement ratio prepared according to a prior art method and the method of this invention.

As a result of an exhaustive investigation regarding a cement paste constituting the basic ingredient of the kneaded compound we have found that the quantity of bleeding water can be greatly reduced by performing two or more kneading operations and by greatly decreasing the quantity of water incorporated at the time of the first kneading. This fact is shown by FIG. 1. Where an ordinary Portland cement is used to prepare a cement paste having a final water to cement ratio (W/C) of 50%, when the percentage of bleeding of the paste which was prepared by incorporating all of the water at a time and then kneaded for 210 seconds is represented by black spots shown whereas when 10 to 40% of the water was incorporated for the first time followed by kneading for 120 seconds, and secondary water of 40~10% was then added followed by the second kneading for 90 seconds, the percentage of bleeding of the resulting cement paste is shown by white circles in FIG. 1 which means that the percentage of bleeding of the latter paste is lower than that of the paste prepared by the first or prior art method. When the primary water of 15~38% is added, the percentage of bleeding of the cement paste thus obtained was lowered by more than 2%. Especially, where the quantity of the primary water is from 15 to 35%, the percentage of bleeding was reduced to less than ½ of that of the cement paste prepared by the prior art method.

Figure 2:
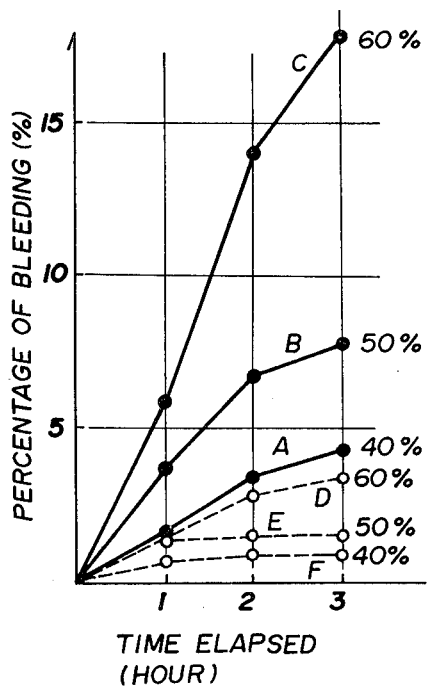
FIG. 2 is a graph showing the result of measurement of the percentage of bleeding of a cement paste prepared according to a prior art method and the method of this invention wherein the water to cement ratio is varied.

When preparing a cement paste by kneading twice, the quantity of the secondary water at the time of the second kneading was varied to prepare the final kneaded paste having a ratio W/C of 40 to 60% while maintaining constant the W/C ratio of 25% during the first kneading. On the other hand, another cement paste having a W/C ratio of 40 to 60 % was prepared according to the prior art method, that is by incorporating all the quantity of water at a time. The result is shown in FIG. 2, in which solid line curves A, B and C show the percentage of bleeding of the cement pastes prepared according to the prior art method. As shown by curve A, where the ratio W/C is 40%, the percentage of bleeding is 4.5%, where the ratio of W/C is 50% as shown by curve B, the percentage of bleeding is 7.8%, whereas when the ratio W/C is 60% the percentage of bleeding increases to 17.5%. On the other hand, when the water is incorporated twice and kneading is also performed twice, even when the ratio W/C is 60% as shown by dotted line curve D the percentage of bleeding is only 3.5%, and where the W/C ratios are 50% and 40% as shown by dotted line curves E and F, the percentage of bleeding is much lower.

FIG. 3 shows the relation between the compression strength of a molded product by using a cement paste prepared by the method of this invention and measured 7 days after molding and the percentage of the primary and secondary waters, the W/C ratio of the paste being 50%, and the total kneading time being 210 seconds for all samples. The molded products utilizing the cement paste prepared by the prior art method and measured at black points have a compression strength of about 220 Kg/cm², whereas the molded products made of a cement paste prepared by kneading twice and using the primary water of from 15 to 38% have a compression strength of higher than 235 Kg/cm². Especially, the molded products utilizing the primary waters of 30% and 35% respectively have a high compression strength of about 300 Kg/cm².

As above described, the cement paste prepared according to the method of this invention, wherein a controlled quantity of the primary water is first added followed by the first kneading and then the secondary water is added followed by the second kneading, has a small percentage of bleeding and the products prepared by using the cement paste of this invention has a high mechanical strength.

The reason of such advantageous improvement has not yet been clearly analyzed, it can be presumed as follows. When water is added to a powder of cement and the mixture is then kneaded, although it is difficult to confirm with human eyes, it is inevitable to form lumps of coagulated fine cement particles. According to the prior art method wherein the necessary quantity of water is incorporated into the powder of cement at one time and then the mixture is kneaded, when lumps of coagulated cement particles are formed, they would not be disintegrated or crushed even when the mixture is kneaded for a long time because water of the quantity necessary to render flowable the cement paste is added. Even when the lumps are disintegrated to some extent in the presence of a sufficient quantity of water, it is impossible to completely disintegrate or disperse all of the cement lumps.

To the contrary, after the first kneading according to the method of this invention, is prepared, a cement paste being in a funicular state wherein water is continuously present between the cement particles and an air film ($F_1$) is continuously or discontinuously present, a capillary state wherein no air film is present and the cement particles are separated from each other by a respective water film deposited thereon, or a slurry condition but close to the capillary state results. Since the cement paste being in such a state does not yet reach to the state of slurry condition wherein the cement particles having no water film are present in continuous water phase so as to show a good fluidability, the torque necessary for kneading the cement paste in such a region is substantially high as shown in FIG. 4. It is considered that in these states, the coagulated lumps are considerably disintegrated due to mutual friction thereof. Although the coagulated lumps would not be completed disintegrated due to mutual friction, the lump size is substantially decreased. When the secondary water is added to the cement paste wherein substantially disintegrated lumps of cement powder-water mixture is subjected to the second kneading operation, the characteristic of the paste would be greatly improved. Since the cement particles of coagulated lumps are sufficiently disintegrated or dispersed, the quantity of the bleeding water can be decreased greatly. Moreover, since the cement particles are efficiently utilized, the mortar or concrete products formed with such improved cement paste having incorporated therein an aggregate (sand and/or gravel) have excellent mechanical strength.

Figure 7:
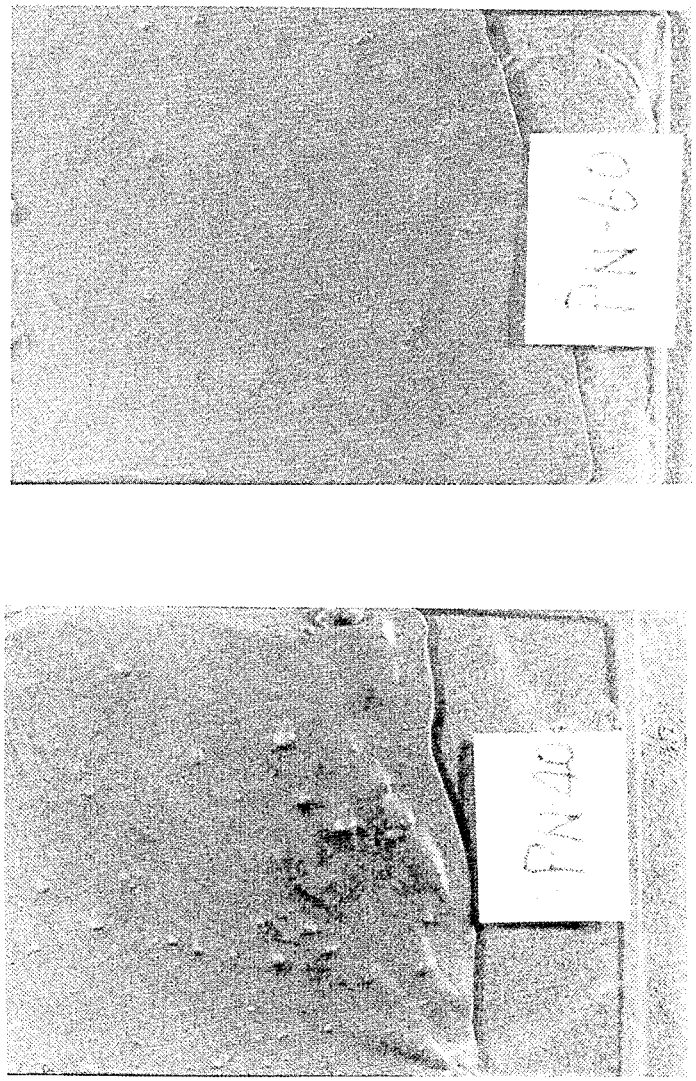
FIG. 7a shows photographs magnified with a magnifying power of 2 showing the state of adhesion of the paste after a glass plate was dipped in cement pastes prepared in accordance with the prior art method, the glass plate having been withdrawn from the cement pastes and surplus cement pastes shaked off.
FIG. 7b shows photographs magnified with a magnifying power of 2 showing the state of adhesion of the paste after a glass plate was dipped in cement pastes prepared in accordance with the method of this invention, the glass plate having been withdrawn from the cement pastes and the surplus cement pastes shaken off.

This fact is shown by enlarged photographs shown in FIG. 7 in which PN-40, PN-60, PS-40 and PS-60 are photographs (enlarged by a factor of 2) showing the states of cement pastes wherein glass plates dipped in the pastes are withdrawn therefrom and then shaked to remove surplus pastes. PN-40 and PN-60 pastes were prepared according to the prior art method and correspond to W/C ratios of 40% and 60%, respectively.

PS-40 and PS-60 pastes whose W/C ratios are 40% and 60% respectively were prepared according to the method of this invention, that is, by adding the primary and secondary waters respectively followed by the kneading steps. PN-40 and PN-60 contain considerably large lumps, whereas PS-40 and PS-60 that are treated with the pastes prepared by the method of this invention (including two kneading steps) contain only a small number of lumps.

The disintegrating effect described above can be enhanced by gradually incorporating the secondary water during the second kneading step over a substantial period. More particularly, after the first kneading step, the paste does not show any appreciable fluidity whereas after being subjected to the second kneading step, the paste develops so as to have excellent fluidity suitable for pouring or casting. The hardness or viscosity of the kneaded paste differs considerably due to static friction, slip friction or rolling friction that prevents relative movement between the lumps of the cement particles, but when portions having a high fluidity are formed as a result of addition of water and kneading, slipping or rolling becomes remarkable at these portions whereas in other portions kneading is performed in a state of paste containing substantial number of lumps so a homogeneous mixture of water and cement powder could not be obtained. Especially, the time at which the kneaded compound becomes flowable or not is important. For example, when the mixture is kneaded under a state in which certain portions become flowable, the slipping and rolling phenomena occur only at such flowable portions, whereas in other portions such rolling and slipping phenomena do not appear. This tendency is remarkable where a desired quantity of water is incorporated at a time to form a flowable compound. In other words, a large number of lumps of cement powder would be formed in the kneaded compound. On the other hand, when the water is gradually added to the water cement mixture during kneading so as to gradually change the state from a nonflowable state to a flowable state the resulting compound would have a uniform fluidity. Accordingly, even when the quantity of water is slightly different from the correct value such difference can be readily compensated for. In this manner, it is possible to prepare a kneaded compound in which water is uniformly distributed throughout the paste and which does not contain any appreciable number of coagulated lumps of cement powder, thus having an excellent fluidity. More particularly, when the primary water is incorporated to the powder of cement no fluidity is expected so that all of the primary water may be incorporated at one time, although it may be incorporated gradually in the same manner as the secondary water, whereas when the secondary water is incorporated for the purpose of imparting a sufficient fluidity to the resulting paste it is essential to add it gradually. The interval in which the secondary water is gradually added is preferably to be longer than 10% of the second kneading time. When the secondary water is incorporated in a short time of less that 10% of the second kneading time, usually longer than 60 seconds, the object of this invention can not be attained. Although the kneading operation may be performed as a batch with a common mixer, since according to this invention water is added in two steps, it is advantageous to use a continuous mixer. Thus, kneaded mortar can be continuously prepared by using a mixer having a suitable length and provided with a screw wherein the first kneading is performed in one side section of the mixer, the secondary water is gradually added at an intermediate section and the second or finishing kneading is performed in the other side section. This method is suitable for manufacturing various concrete products according to a continuous system. Of course, the mixture can be continuously prepared by using 3 mixers wherein a first mixer is used for the first kneading, a second mixer for the second kneading while the secondary water is gradually added, and a third mixer is used for the finishing kneading.

Figure 6:
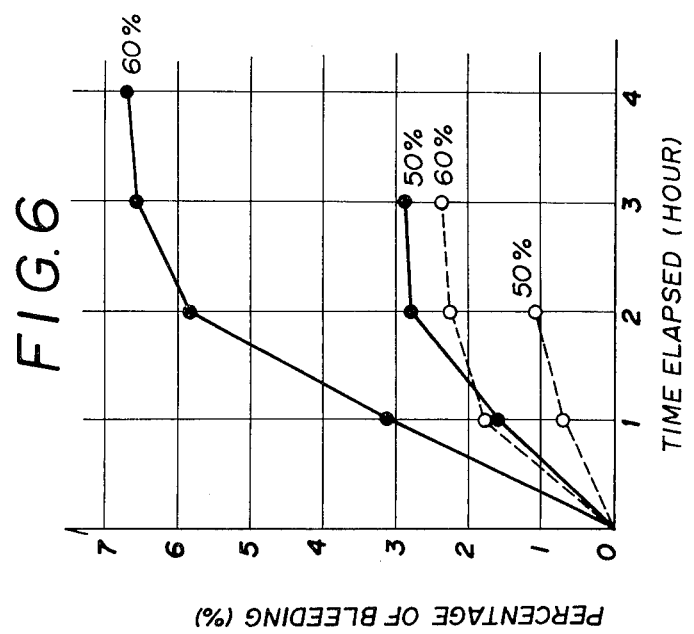
FIG. 6 is a graph showing the result of measurement of the percentage of bleeding of a quick setting cement paste in a same manner as in FIG. 5.
Figure 5:
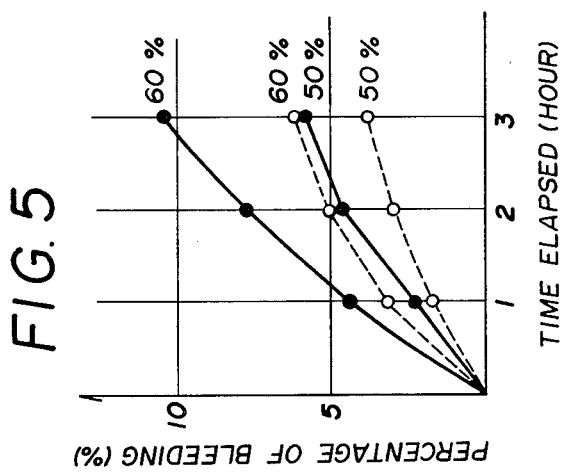
FIG. 5 is a graph showing the result of measurement of the percentage of bleeding of a cement paste prepared according to a prior art method and the method of this invention wherein flyash cement is used.

While in the foregoing description, cement was most commonly used as a hydraulic substance, it should be understood that other hydraulic substances can also be used. For example, 25% or 30% of the primary water was incorporated into C type flyash followed by the first kneading, then 25% or 30% of the secondary water was added and then subjected to the second kneading. The percentage of the bleeding of the resulting paste was measured and the results are shown in FIG. 5 together with the results of a paste having a W/C ratio of 50% or 60% which was prepared by the prior art method. In FIG. 5, solid line curves show the percentage of bleeding of the pastes prepared by the prior art method, whereas dotted line curves show that of the pastes prepared in accordance with the method of this invention, that is the pastes subjected to two kneading operations. Comparison of the solid line curves with the dotted line curves of this invention clearly shows the advantageous effect of the method of this invention, that is the great decrease in the percentage of the bleeding. Molded products utilizing the paste prepared according to the method of this invention have higher mechanical strength than those of the prior art methods. Similar tests were made for quick setting cement and the results are shown in FIG. 6. Again solid line curves show the percentage of bleeding of pastes prepared by the conventional method and dotted line curves show the percentage of bleeding of pastes prepared with the method of this invention. FIG. 6 shows that the reduction in the percentage of bleeding is more remarkable than that of ordinary cement.

The cement pastes described above can be used to manufacture various cement products or for various civil works without adding an aggregate. For example, the paste can be poured into a mold prepacked with an aggregate, or poured or injected into underground stratums for reinforcing the same. However, this invention further contemplates that the cement paste thus prepared is used for preparing mortar by adding a fine aggregate or green concrete by adding a coarse aggregate as well as a fine aggregate. In case of preparing the mortar, the quantity of the secondary water is determined by taking into consideration the quantity of water deposited on the surface of the sand particles so as to obtain a desired W/C ratio of the resulting mortar. Of course, coarse aggregates can be incorporated together with sand to prepare the green concrete.

Where the order of incorporation of the fine and coarse aggregates is selected properly, it is possible to decrease further the percentage of bleeding thereby producing mortar or concrete products having higher mechanical strength. More particularly, it is advantageous to incorporate a fine aggregate or a corase aggregate or a mixture thereof between the first and second kneading operations. Then, the added aggregate functions just like balls of a ball mill under a state after a relatively small quantity of the primary water has been incorporated to crush or disintegrate the lumps of cement, thereby further decreasing the percentage of bleeding. A suitable additive, for example dehydration agent or a setting accelerator may be incorporated into the mixture thus prepared. Since the quantity of the primary water at the time of the first kneading is small, the kneaded compound is in a funicular state, capillary state or slurry condition close to the capillary state, the torque required for kneading is high so that considerable disintegrating effect is applied to the coagulated lumps of cement powder in the same manner as above described. Sand or gravel utilized to prepare mortar or green concrete has larger weight than other constituents of the mortar or green concrete so that since these aggregates are kneaded under a state containing a relatively small quantity of added water, the aggregates impart percussive force to the coagulated lumps thus efficiently decreasing the number of the same.

When preparing mortar or green concrete by incorporating an aggregate and the secondary water in an amount determined by taking into consideration the quantity of water adhering on the surface of the aggregate it is advantageous to make uniform the quantity of water adhered to the surface of the aggregate by using impact or percussive force as disclosed in our Japanese patent application No. 28266/1979 (Japanese Laid Open Patent Specification No. 121374/1980). Since the quantity of water adhering to the surface of a fine aggregate varies greatly, where the quantity of water on the surface of sand is made uniform, the W/C ratio can be readily adjusted to a desired value. Although the first and second kneading may be performed in a single mixer, in the first kneading operation, the mixture of water and cement is somewhat powdery or resembles clay, but after the second kneading operation, the mixture will have a suitable viscosity. When carrying out the method of this invention, it is therefore advantageous to use independent mixers for the first and the second kneading operations respectively thus continuously preparing mortar or green concrete. The two mixers are operated in cascade to continuously prepare mortar or green concrete.

Of course, during the first or second kneading operation both such additives as a dehydrator or an air entraining agent can be incorporated.

To have a better understanding of the present invention the following examples are given but it should be understood that the invention is not limited to these specific examples.

EXAMPLE 1

Water of a quantity corresponding to a W/C ratio of 25% was added to the entire quantity of ordinary Portland cement and the mixture was subjected to the first kneading operation for 120 seconds by using a forced agitation type mixer. Thereafter, the secondary water of a quantity corresponding to a W/C ratio of 25% was incorporated followed by the second kneading operation for 90 seconds, thereby preparing the cement paste having a W/C ratio of 50%. The percentage of bleeding was 1.8% 3 hours after preparation of the cement paste. The molded product made of this cement paste had a compression strength of 263 Kg/cm$^2$ 7 days after molding.

On the other hand, a cement paste prepared by adding water of a quantity corresponding to a W/C ratio of 50% to the same cement and then kneading the mixture for 210 seconds had a percentage of bleeding of 7.2% 3 hours after preparation of the paste. Further, the molded product formed with this cement paste had a compression strength of 223 Kg/cm$^2$ 7 days after molding. This shows that the percentage of bleeding of the paste prepared by the method of this invention is ¼ of that prepared by the conventional method, and that the compression strength of the molded product formed with the cement paste prepared by the method of this invention is higher by 40 Kg/cm$^2$ than that made of a cement paste prepared according to the conventional method.

EXAMPLE 2

Cement mortar having a sand to cement ratio (S/C) of 2, and a W/C ratio of 55% was prepared by admixing 606 Kg of cement and 1212 Kg of sand. The cement mortar was prepared by (1) a conventional method wherein the sand, cement and water were simultaneously mixed together and the mixture was then kneaded for 90 seconds, (2) cement and water were kneaded for 120 seconds, then sand was added followed by a kneading operation for 90 seconds, (3) according to the method of this invention wherein the primary water of a quantity corresponding to a W/C ratio of 28% was added to the all quantity of cement followed by the first kneading for 120 seconds, and then the secondary water of a quantity corresponding to a W/C ratio of 27% and the all quantity of sand were incorporated followed by the second kneading for 90 seconds, and (4) in the same manner as the method (3) subsequent to the first kneading the secondary water of a quantity corresponding to a W/C ratio of 27% was added. After subjecting the mixture to the second kneading for 90 seconds, all quantity of dry sand was incorporated and the resulting mixture was subjected to the third kneading for 90 seconds.

With regard to the mortars prepared by the methods (1) through (4) described above, the percentage of bleeding 3 hours after preparation, the table flow values immediately after preparation, and the compression strength of the molded products respectively made of these mortars 1 week and 4 weeks after molding were measured and the measured values are shown in the following Table I.

TABLE I

| method of kneading | percentage of bleeding % | table flow (mm) | compression strength (Kg/cm$^2$) | |
|---|---|---|---|---|
| | | | 1 W | 4 W |
| 1  S + C + W $\xrightarrow{90 \text{ sec.}}$ | 4.4 | 266 | 318 | 444 |
| 2  C + W $\xrightarrow{120 \text{ sec.}}$ S $\xrightarrow{90 \text{ sec.}}$ | 4.6 | 270 | 315 | 436 |
| 3  C + W$_1$ $\xrightarrow{120 \text{ sec.}}$ S + W$_2$ $\xrightarrow{90 \text{ sec.}}$ | 1.9 | 253 | 384 | 513 |
| 4  C + W$_1$ $\xrightarrow{120 \text{ sec.}}$ W$_2$ $\xrightarrow{90 \text{ sec.}}$ S $\xrightarrow{90 \text{ sec.}}$ | 2.0 | 255 | 377 | 502 |

Remark: C: cement; S: sand; W: water; W$_1$: primary water; W$_2$: secondary water As can be noted from this Table I, the percentage of bleeding of the mortars prepared by the methods (3) and (4), that is the method of this invention is less than ½ of that of the mortars of the control examples (1) and (2), and the compression strength of the mortars of this invention is about 15% higher than that of the control examples (1) and (2).

EXAMPLE 3

Green concretes were prepared by admixing fine sand, cement, water and 0.7% of an additive such that the green concrete will have a ratio S/C of 2.17, a percentage of the fine aggregate to the aggregates (S/a) of 46.4% and a W/C ratio of 50%. The green concretes were prepared according to the following five methods. (1) All ingredients were added simultaneously and the resulting mixture was kneaded for 90 seconds. (2) After kneading a mixture of cement and water for 120 seconds, other ingredients were incorporated followed by a kneading operation for 90 seconds. (3) The quantities of the primary and secondary waters were selected to establish a W/C ratio of 25% respectively. After first kneading for 120 seconds a mixture of cement and the primary water, the secondary water and other ingredients were incorporated and the mixture was subjected to the second kneading for 90 seconds. (4) The same first kneading as that of the method (3) was performed with a mortar mixer and the second kneading was performed with a concrete mixer. (5) After performing the same first kneading operation as the method (3), the secondary water was added and the mixture was subjected to the second kneading operation for 90 seconds, and thereafter, sand, gravel and an additive were incorporated and the resulting mixture was subjected to the third kneading operation for 90 seconds. The characteristics, the percentage of bleeding and the compression strength of the green concretes prepared by respective methods were measured and the results of measurements are shown in the following Table II in which (1) and (2) are control examples prepared by the prior art methods whereas (3), (4) and (5) are green concretes prepared according to the method of this invention.

TABLE II

| method of preparation | slump cm | air quantity % | percentage of bleeding % | compression strength (Kg/cm²) 1 W | 4 W |
|---|---|---|---|---|---|
| 1 S + G + C + W + A ⟶ | 19.0 | 4.6 | 2.20 | 220 | 354 |
| 2 C + W ⟶ S + G + A ⟶ | 18.5 | 4.0 | 2.86 | 240 | 355 |
| 3 C + W₁ ⟶ S + G + W₂ + A ⟶ | 17.5 | 3.6 | 0.94 | 283 | 384 |
| 4 C + W₁ ⟶ S + G + W₂ + A ⟶ (mortar mixer) | 18.0 | 4.0 | 0.87 | 274 | 377 |
| 5 C + W₁ ⟶ W₂ ⟶ S + G + A ⟶ | 18.2 | 3.8 | 1.24 | 263 | 372 |

Remark: G represents a coarse aggregate, and A an additive

Where a coarse aggregate was added as above described, the green concretes prepared by the methods (3), (4) and (5) embodying the invention have greatly decreased percentage of bleeding and the molded products made thereof have higher compression strength than those of the prior art.

EXAMPLE 4

1305 Kg of cement and 587 Kg of water were kneaded to form a cement paste. At this time, 196 Kg of water was added followed by the first kneading for 60 seconds and the second water was added at different periods during the second kneading. Various kneading operations performed in this examples were as shown in the following Table III.

TABLE III

| symbol | first kneading time (sec.) | period of incorporating | second kneading time (sec.) | total (sec.) | time of incorporation second kneading time |
|---|---|---|---|---|---|
| P 0-120 | 60 | 0 (simultaneously added) | 120 | 180 | |
| P 100-20 | " | 100 | 120 | " | 83.3% |
| P 60-60 | " | 60 | 120 | " | 50% |
| P 120-0 | " | 120 | 120 | " | 100% |
| P 20-100 | " | 20 | 120 | " | 16.6% |

The characteristics of the cement pastes shown in Table III were measured and shown in the following Table IV.

TABLE IV

| | | | cylinder penetration R = 5.25 cm, l = 11.7 cm, r = 1.0 cm | | | percentage of bleeding time elapsed (hour) | | | quantity of cement lumps |
|---|---|---|---|---|---|---|---|---|---|
| symbol | weight (Kg/l) | W (g) | h (cm) | α (g/cm³) | α₁₀ (g/cm³) | 1 | 2 | 3 | (g) |
| P 0-120 | 1.825 | 57.6 | 8.6 | 0.308 | 0.286 | 2.52 | 4.39 | 4.84 | 35.3 |
| P 100-20 | 1.920 | " | 7.4 | 0.559 | 0.481 | 1.74 | 2.83 | 2.93 | 8.4 |
| P 60-60 | 1.910 | " | 7.6 | 0.504 | 0.440 | 1.33 | 2.28 | 2.38 | 11.7 |
| P 120-0 | 1.901 | " | 7.5 | 0.545 | 0.472 | 1.70 | 2.76 | 2.83 | 4.9 |
| P 20-100 | 1.875 | " | 8.1 | 0.390 | 0.351 | 1.87 | 3.17 | 3.37 | 24.0 |

The cylinder penetration test shown in Table IV is carried out in such manner that a cylinder is penetrated into each kneaded compound under the same boundary condition and the difference between a value obtained by dividing the weight of the cylinder by the volume of penetration of the cylinder and the apparent specific gravity of the compound is expressed by $\alpha$. In Table IV, $\alpha_{10}$ represents the value of $\alpha$ at a penetration depth of 10 cm of the cylinder. R represents the radius of a container for accommodating the cylinder, r the radius of the cylinder, l the length thereof, W its weight and h the actual penetration depth.

The results shown in Table IV are depicted in FIGS. 8 and 9. As shown in FIG. 8, the unit volume weight varies with the variation in the period of incorporation of the secondary water, the variation being similar to that shown in FIG. 6 even for the identical cement pastes consisting of cement and water. According to this invention the quantity of air entrained in the paste decreases so that the unit volume weight of the paste increases. The depth of penetration of the cylinder $\alpha_{10}$ increases with the period of incorporation of the secondary water as shown in FIG. 9.

The quantity of the cement lumps decreases with the period of incorporation of the secondary water as shown in FIG. 10, while the percentage of bleeding varies as shown in FIG. 11 which shows that excellent result can be obtained when the secondary water is gradually incorporated over a period of from 20 to 100 seconds, especially for about 60 seconds. Comparison of FIG. 8 with FIG. 11 shows that the paste prepared by the method of this invention and having a high unit volume weight as shown in FIG. 8 has small percentage of bleeding. Accordingly, by measuring the unit volume weights of respective pastes it is possible to forecast their percentage of bleeding or other characteristics, such forecast values being used as indices.

Figure 12:
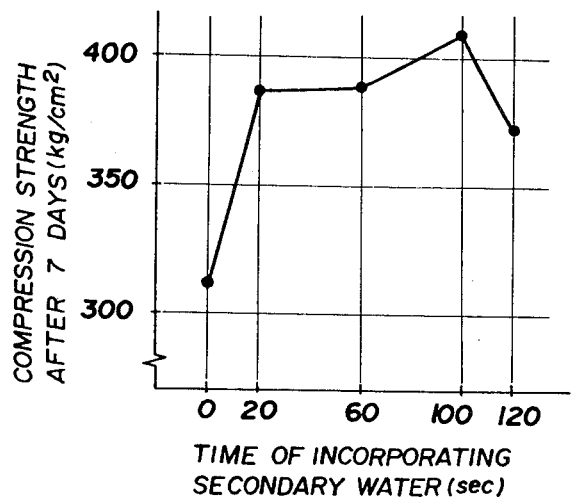
FIG. 12 is a graph showing the relationship between the compression strength of the product 7 days after molding and the time of incorporation of the secondary water.

The measured values of the cement products made of respective pastes are shown in the following Table V and in FIG. 12. The compression strength of the molded products utilizing pastes in which the secondary water was incorporated gradually is higher than those made of pastes in which the secondary water was incorporated at a time. Especially, where the secondary water is gradually incorporated over a period of about 100 seconds, the cement products have the highest compression strength.

TABLE V

| period of incorporation of secondary water sec. | average compression strength (Kg/cm$^2$) | |
|---|---|---|
| | after 7 days | after 28 days |
| 0 (incorporated at a time) | 311 | 401 |
| 20 | 386 | 482 |
| 60 | 388 | 489 |
| 100 | 408 | 518 |
| 120 | 372 | 471 |

EXAMPLE 5

In this example, mortars were prepared having water to cement ratios (W/C) and a sand to cement ratio (S/C) as shown in the following table VI. The first sample PSM-30-60 was prepared by the steps of incorporating the primary water ($W_1$) into cement (C), subjecting the resulting mixture to the first kneading operation for 90 seconds, incorporating sand (S), again kneading the mixture for 90 seconds, and incorporating the secondary water ($W_2$) for 30 seconds while kneading for 60 seconds. The second sample PSM-60-30 was prepared by incorporating the secondary water for 60 seconds while kneading for 30 seconds. In each sample the second kneading was performed for 90 seconds after incorporation of the secondary water, and the total kneading time was 270 seconds.

TABLE VI

| W/C (%) | W$_1$/C (%) | S/C | C (Kg) | S (Kg) | W (l) |
|---|---|---|---|---|---|
| 54 | 24 | 2 | 619 | 1238 | 334 |

The measured values of the characteristics of these mortar samples are shown in the following Table VII.

TABLE VII

| sym-bol | unit volume weight (Kg/l) | cylinder penetration R = 5.25, l = 11.7, r = 1.0 | | | | percentage of bleeding (%) time elapsed (hour) | | | |
|---|---|---|---|---|---|---|---|---|---|
| | | W (g) | h (cm) | $\alpha$ (g/cm$^3$) | $\alpha_{10}$ (g/cm$^3$) | 1 | 2 | 3 | 4 |
| PSM 30-60 | 2.240 | 257.6 | 7.1 | 9.315 | 7.855 | 1.50 | 2.34 | | |
| PSM 60-30 | 2.230 | " | 10.0 | 5.974 | 5.798 | 1.62 | 2.63 | | |

Molded products were prepared by using mortars shown in Table VI and a mortar in which the secondary water was incorporated at a time, and the compression strengths of the products 7 and 28 days after the molding were measured and the results are shown in the following Table VIII.

TABLE VIII

| period of incorporating secondary water (sec.) | average compression strength (Kg/cm$^2$) | |
|---|---|---|
| | after 7 days | after 28 days |
| 0 | 296 | 417 |
| 30 | 344 | 486 |
| 60 | 338 | 450 |

EXAMPLE 6

Green concrete samples having compositions as shown in the following Table IX were prepared. Thus, a sample PSG-30-60 was prepared by firstly kneading a mixture of cement and the primary water, adding sand (S) and a coarse aggregate (G) followed by a second kneading operation for 90 seconds. The secondary water and a dehydration agent were incorporated for 30 seconds while kneading for 60 seconds. A second sample PSG-60-30 was prepared by incorporating the secondary water and a dehydration agent for 60 seconds while kneading the mixture for 30 seconds.

TABLE IX

| W/C (%) | W$_1$/C (%) | S/a | C (Kg) | S (Kg) | G (Kg) | W (l) |
|---|---|---|---|---|---|---|
| 50 | 25 | 464 | 373 | 809 | 941 | 187 |

Measured characteristics of these samples of the green concrete are shown in the following Table X.

TABLE X

| symbol | unit vol. weight Kg/l | air (%) | temp. (°C.) | slump (cm) | percentage of bleeding (%) 1 | 2 | 3 |
| --- | --- | --- | --- | --- | --- | --- | --- |
| PSG-30-60 | 2.396 | 1.2 | 25.5 | 17.0 | 0.17 | 0.24 | — |
| PSG-60-30 | 2.387 | 1.8 | 25.0 | 16.0 | 0.06 | 0.35 | — |

The measured compression strengths of the molded products utilizing these green concrete and of a molded product made of a green concrete in which a period of incorporating the secondary water is zero (i.e. water is simultaneously added are shown in the following Table XI.

TABLE XI

| period of incorporating the secondary water (sec.) | average compression strength (Kg/cm²) | |
| --- | --- | --- |
|  | after 7 days | after 28 days |
| 0 | 263 | 372 |
| 30 | 340 | 435 |
| 60 | 345 | 450 |

EXAMPLE 7

Ordinary Portland cement and river sand (having a particle size of less than 5 mm, a FM (Fineness Molulus) of 3.09, a specific gravity of 2630 Kg/l measured according to the Japanese Industrial Standard (JIS) A1109, a rate of water absorption of 1.43%, and a water content of 3.41%) were mixed together at a sand to cement ratio S/C of 1~5. A constant quantity of 24% (based on the weight of cement of the primary water ($W_1$) was incorporated to the mixture of sand and cement and the resulting mixture was subjected to the first kneading operation. Then secondary water ($W_2$) was added to the mixture and it was subjected to the second kneading operation. The cement, the primary water ($W_1$), the secondary water ($W_2$) and sand (S) were admixed according to the following three methods.

$C + W_1 \rightarrow W_2 \rightarrow S \rightarrow$                  (A)

$C + W_1 \rightarrow S \rightarrow W_2 \rightarrow$                  (B)

$C + W_1 \rightarrow S + W_2 \rightarrow$                  (C)

Arrows show kneading for 60 seconds. In order to make the total kneading time to be the same the kneading time required for admixing sand (S) and the secondary water ($W_2$) of the method C was made to be 120 seconds.

Examples of the compositions wherein the ratio S/C was varied in a range of 1 to 5 are shown in the following Table XII.

TABLE XII

| S/C | W/C (%) | $W_1$/C (%) | C (Kg) | S (Kg) | W (Kg) |
| --- | --- | --- | --- | --- | --- |
| 1 | 45 | 24 | 872 | 872 | 392 |
| 2 | 54 | " | 619 | 1238 | 334 |
| 3 | 68 | " | 468 | 1404 | 318 |
| 4 | 87 | " | 369 | 1476 | 321 |
| 5 | 110 | " | 301 | 1505 | 331 |

The quantity of the secondary water ($W_2$) can be obtained by subtracting the quantity of the primary water and the quantity of water adhered to the sand particles from the water quantity of the total water, taking into consideration of W/C ratio of the resulted mortar.

Among three methods described above the method B is the preferred method of this invention.

The physical characteristics and the percentage of bleeding of the mortars prepared by the methods A, B and C, and the average compression strength of the molded products made of respective mortars are shown in the following Table XIII.

TABLE XIII

| Method | S/C | unit volume weight (Kg/l) | cylinder penetration R = 5.25, l = 11.7, r = 1.0 | | | | percentage of bleeding (%) time elapsed (hour) | | | average compression strength (Kg/cm²) | |
| --- | --- | --- | --- | --- | --- | --- | --- | --- | --- | --- | --- |
| | | | w (g) | h (cm) | α (g/cm³) | $α_{10}$ (g/cm³) | 1 | 2 | 3 | after 7 days | after 28 days |
| A | 1 | 2.161 | 107.6 | 8.4 | 1.919 | 1.760 | 1.07 | 2.04 | 2.19 | 379 | 503 |
| | 2 | 2.216 | " | 8.0 | 2.067 | 1.850 | 2.04 | 4.25 | 4.97 | 311 | 410 |
| | 3 | 2.216 | " | 7.9 | 2.122 | 1.887 | 3.40 | 5.66 | 6.16 | 209 | 274 |
| | 4 | 2.196 | " | 10.0 | 1.231 | 1.231 | 5.55 | 9.57 | 11.34 | 121 | 168 |
| | 5 | 2.168 | 77.6 | 9.0 | 0.578 | 0.549 | 7.61 | 12.75 | 15.17 | 65 | 86 |
| B | 1 | 2.161 | 107.6 | 6.9 | 2.805 | 2.332 | 0.16 | 1.12 | 0.00 | 401 | 528 |
| | 2 | 2.222 | " | 6.2 | 3.305 | 2.604 | 1.44 | 2.69 | 2.87 | 333 | 428 |
| | 3 | 2.222 | " | 6.0 | 3.489 | 2.705 | 2.64 | 3.96 | 4.21 | 208 | 273 |
| | 4 | 2.190 | " | 8.2 | 1.989 | 1.802 | 4.17 | 6.23 | 7.10 | 109 | 140 |
| | 5 | 2.180 | " | 9.6 | 1.390 | 1.363 | 7.01 | 9.18 | 10.09 | 55 | 91 |
| C | 1 | 2.162 | " | 8.1 | 2.07 | 1.86 | 1.28 | 2.35 | — | 450 | 578 |
| | 2 | 2.210 | " | 8.2 | 1.97 | 1.78 | 1.98 | 3.47 | 4.25 | 348 | 439 |
| | 3 | 2.220 | " | 7.8 | 2.17 | 1.92 | 3.27 | 5.91 | 6.92 | 206 | 271 |
| | 4 | 2.190 | " | 7.9 | 2.15 | 1.91 | 5.36 | 8.85 | 10.72 | 104 | 131 |
| | 5 | 2.175 | 77.6 | 7.8 | 6.99 | 0.88 | 9.24 | 11.90 | 13.41 | 59 | 78 |

Figure 13:
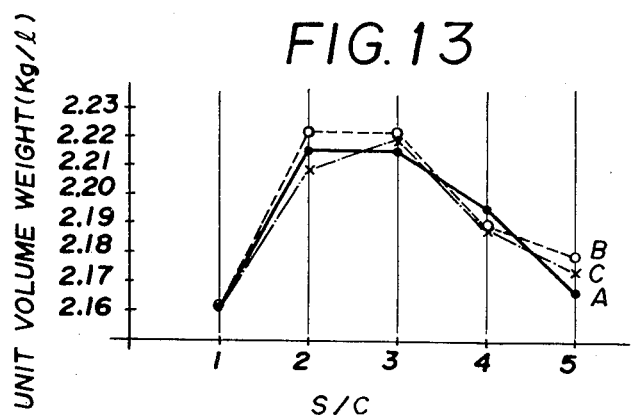
FIG. 13 is a graph showing the relationship between the unit volume weight and a sand to cement (S/C) ratio.
Figure 14:
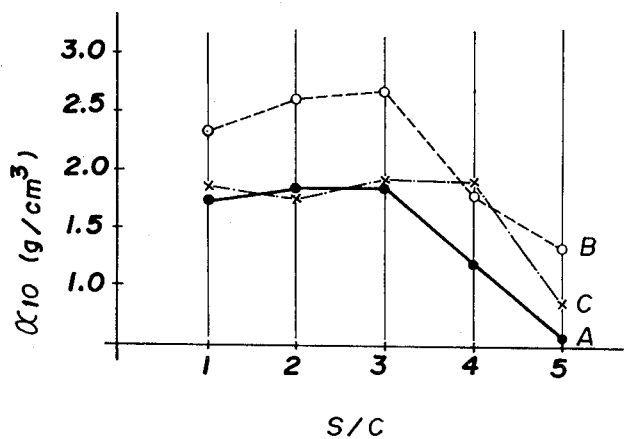
FIG. 14 is a graph showing the relationship between the degree of cylinder penetration and a S/C ratio.

The unit volume weights of the mortars prepared by methods A, B and C are depicted in FIG. 13, and the cylinder penetration characteristic is shown in FIG. 14. The mortar shown by curve B shown in FIG. 14, that is the mortar prepared by the preferred method of this invention, has $α_{10}$ of higher than 2.0, as far as the S/C ratio thereof is 1~3.

Figure 15:
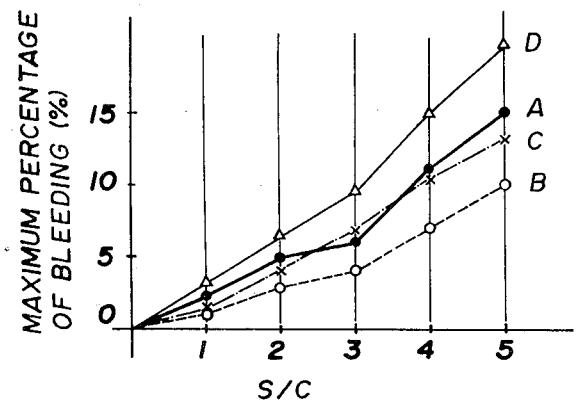
FIG. 15 is a graph showing the relationship between the percentage of bleeding of the S/C ratio of the products utilizing green concretes prepared by the method of this invention and of a control product.

The percentages of bleeding of the mortars prepared by the methods A, B and C are shown in FIG. 15 together with the percentage of bleeding of a mortar D having the same composition but prepared by the prior art method. As can be noted from FIG. 15, the mortar prepared by method B, that is the preferred method of this invention has greatly decreased percentage of bleeding. It was also found that the concrete product made of this mortar has high mechanical strength.

EXAMPLE 8

In this example, the same sand and cement as in Example 7 were used and the mixture was kneaded in accordance with the method B described above. The S/C ratio was a constant intermediate value of 3.0. The mortars had the formulations as shown in the following Table XIV, and the quantity of water on the surface of sand particles was varied.

TABLE XIV

| | | | ingredients in 1 m$^3$ | | |
|---|---|---|---|---|---|
| S/C | W/C (%) | W$_1$C (%) | cement (Kg) | sand (Kg) | water (Kg) |
| 3.0 | 68.0 | 24.0 | 468 | 140.4 | 318 |

The quantity of the water on the sand (S) surface was varied from 0 (surface dry state) to 14% at a step of 2%. The quantity of the surface water was adjusted by making uniform the quantity of the surface water by applying an impact force and then adding deficient quantity of water by spraying to obtain desired quantity of the surface water.

The physical characteristics of the mortars prepared by the method B and the average compression strength of the molded products utilizing these mortars are shown in the following Table XV.

TABLE XV

| percentage of surface water (%) | unit volume weight (Kg/l) | cylinder penetration R = 5.25, l = 11.7, r = 1.0 | | | | percentage of bleeding (%) | | | average compression strength (Kg/cm$^2$) | |
|---|---|---|---|---|---|---|---|---|---|---|
| | | W (g) | r (cm) | α (g/cm$^3$) | α$_{10}$ (g/cm$^3$) | time elapsed (hour) | | | after 7 days | after 28 days |
| | | | | | | 1 | 2 | 3 | | |
| 0 | 2.208 | 107.6 | 6.2 | 3.32 | 2.61 | 2.83 | 4.21 | 4.28 | 206 | 301 |
| 2.0 | 2.221 | " | 6.3 | 3.22 | 2.55 | 2.33 | 3.65 | 3.71 | 215 | 313 |
| 4.0 | 2.236 | " | 7.0 | 2.66 | 2.22 | 2.58 | 4.03 | 4.21 | 223 | 316 |
| 6.0 | 2.245 | " | 5.3 | 4.22 | 3.07 | 2.20 | 3.40 | 3.46 | 240 | 322 |
| 8.0 | 2.246 | " | 4.8 | 4.89 | 3.39 | 2.01 | 3.14 | 3.21 | 231 | 314 |
| 10.0 | 2.220 | " | 7.7 | 2.23 | 1.96 | 2.26 | 3.65 | 3.71 | 223 | 321 |
| 12.0 | 2.221 | " | 7.5 | 2.35 | 2.03 | 2.64 | 4.28 | 4.53 | 236 | 342 |
| 14.0 | 2.230 | " | 7.8 | 2.16 | 1.91 | 2.83 | 4.28 | 4.53 | 213 | 310 |

Figure 16:
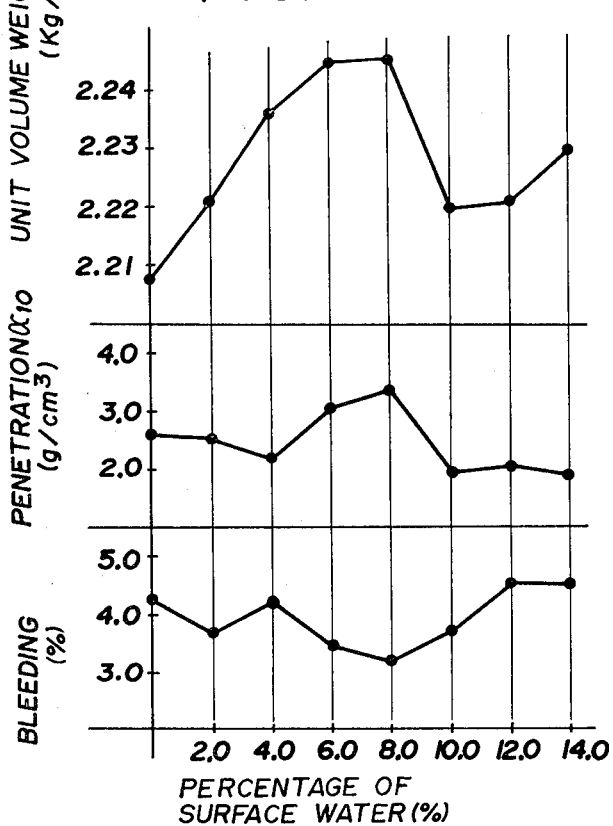
FIG. 16 are graphs showing the relationship between the percentage of surface water of sand and the unit volume weight, the degree of cylinder penetration and the percentage of bleeding wherein the S/C ratio is 3.0, the water to cement (W/C) ratio is 68%, and the ratio of water to cement is 24% at the time of the first kneading operation.

Thus, in each case, an advantageous result was obtained. Especially, where the percentage of the surface water was made to be about 6%, the mechanical strength of the product is high. The percentage of bleeding can be greatly decreased where sand having percentages of the surface water of the order of 2 to 10% is used. These results are depicted in FIG. 16.

EXAMPLE 9

A cement mortar having a composition as shown in the following Table XVI was prepared by the steps of admixing cement, the primary water and sand, and then subjecting the resulting mixture to the first kneading operation, for 90 seconds, adding the secondary water (W$_2$) in a quantity sufficient to make the final W/C ratio to be 54%, and then subjecting the mixture to the second kneading operation for 90 seconds.

TABLE XVI

| W/C (%) | W$_1$/C (%) | S/C | C (Kg) | S (Kg) | W (l) |
|---|---|---|---|---|---|
| 54 | 24 | 2 | 619 | 1238 | 334 |

The physical characteristics of the mortar thus prepared, and average compression strength of the molded products utilizing this mortar are shown in the following Table XVII. This table shows that the mortar has an excellent molderability, small percentage of bleeding and can produce products having high compression strength.

TABLE XVII

| | cylinder penetration R = 5.25, l = 11.7, r = 1.0 | | | | percentage of bleeding (%) | | | | average compression strength (Kg/cm$^2$) | |
|---|---|---|---|---|---|---|---|---|---|---|
| (Kg/l) | W (g) | h (cm) | α (g/cm$^3$) | α$_{10}$ (g/cm$^3$) | time elapsed (hour) | | | | after 7 days | after 28 days |
| | | | | | 1 | 2 | 3 | 4 | | |
| 2.226 | 157.6 | 9.7 | 2.948 | 2.906 | 1.45 | 2.02 | | | 345 | 508 |

Where a mortar having the same composition as that shown in Table XVI is prepared in accordance with the conventional method, the percentage of bleeding after 3 hours was 5.2% and the compression strength of the molded products made of such mortar was 305 Kg/cm$^2$ 7 days after the molding and 430 Kg/cm$^2$ 28 days after the molding.

EXAMPLE 10

A green concrete having a composition as shown in the following Table XVIII was prepared in which G represents a coarse aggregate comprising crushed stone of FM=6.43 and S/a a sand to aggregates ratio. Further 0.02% based on the weight of cement of an air entraining agent (Ad), that is sodium resinate was added to the green concrete.

TABLE XVIII

| W/C (%) | W$_1$/C (%) | S/a | C (Kg) | S (Kg) | G (Kg) | W (l) |
|---|---|---|---|---|---|---|
| 50 | 25 | 46.4 | 373 | 809 | 941 | 187 |

Kneading operations were performed according to the following two methods.

$$C+W_1 \rightarrow S+G \rightarrow W_2+Ad \rightarrow \qquad (B_1)$$

$$C+W_1 \rightarrow S+G \rightarrow W_2+Ad \rightarrow \qquad (B_2)$$

Arrows represent kneading operations each performed for 90 seconds. The kneading time succeeding to the steps C+W$_1$+S+G of the method B$_2$ was 120 seconds. The physical characteristics of the resulting green concrete and the average compression strength of the concrete products made of these green concretes are shown in the following Table XIX.

TABLE XIX

| method | slump (cm) | air (%) | percentage of bleeding (%) | | | | average compression strength (Kg/cm$^2$) | |
|---|---|---|---|---|---|---|---|---|
| | | | 1H | 2H | 3H | max. | after 7 days | after 28 days |
| (B$_1$) | 20.1 | 1.6 | 0.29 | 0.53 | 0.73 | 0.73 | 362 | 499 |
| (B$_2$) | 19.0 | 1.1 | 0.28 | 0.58 | 0.78 | 0.78 | 332 | 471 |

This table shows that the percentage of bleeding of these green concretes are very low and that the mechanical strength of the concrete produced utilizing these green concretes are high. When a green concrete having the same composition as that shown in Table XVIII was kneaded according to the prior art method, the percentage of bleeding was 2.2% 3 hours after preparation, and the compression strength of the concrete products utilizing such green concrete was 220 Kg/cm$^2$ 7 days after the molding and 354 Kg/cm$^2$ 28 days after the molding.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method of preparing a kneaded compositon comprising the steps of:
   incorporating a primary water to a powder of a hydraulic substance such as cement in a quantity sufficient to form a funicular state, capillary state or slurry condition close to the capillary state;
   subjecting the resulting mixture to a first kneading operation so as to decrease coagulated lumps of said powder;
   adding a secondary water to said kneaded mixture in a quantity necessary to form a predetermined water to cement ratio of said composition; and
   subjecting the resulting mixture to a second kneading operation;
   said quantity of primary water being selected to correspond to said predetermined water to cement ratio of said composition and the quantity of said secondary water being selected to correspond to a forecasted quantity of bleeding water.

2. The method according to claim 1, wherein the quantity of said primary water incorporated into said hydraulic substance powder amounts to 15-38% based on the weight of said powder.

3. The method according to claim 1, wherein the quantity of said primary water amounts to 30-76% by weight of the total quantity of water necessary for preparing said compositions.

4. The method according to claim 1, wherein said secondary water is incorporated over a time of more than 10% of a period in which said secondary kneading operation is performed.

5. The method according to claim 1, wherein a dehydration agent is added during said first or second kneading operation.

6. A method of preparing a kneaded composition comprising the steps of:
   incorporating a primary water to a powder of a hydraulic substance such as cement in a quantity sufficient to form a funicular state, capillary state or slurry state close to the capillary state;
   subjecting the resulting mixture to a first kneading operation so as to decrease coagulated lumps of said powder;
   incorporating a fine aggregate having water adhered thereto;
   adding a secondary water to said kneaded mixture in a quantity necessary to form a predetermined water to cement ratio of said composition; and
   subjecting the resulting mixture to a second kneading operation;
   the quantity of said secondary water being determined by taking into consideration the quantity of water adhered to said fine aggregate.

7. The method according to claim 6, wherein said fine aggregate is incorporated together with said primary water to said powder, prior to the first kneading operation.

8. The method according to claim 6, wherein the addition of said fine aggregate is followed by an intermediate kneading which, in turn, is followed by the addition of said secondary water to the resulting kneaded mixture.

9. The method according to claim 6, wherein said fine aggregate is incorporated together with said secondary water, followed by said second kneading operation.

10. The method according to claim 6, wherein the quantity of said primary water amounts to 30-76% by weight of the total quantity of water necessary for preparing said composition.

11. The method according to claim 6, wherein said secondary water is incorporated over a time of more than 10% of a period in which said secondary kneading operation is performed.

12. The method according to claim 6, wherein a dehydration agent is added during said first or second kneading operation.

13. The method according to claim 6, wherein said fine aggregate is pretreated so that a predetermined quantity of water is adhered thereto.

14. The method according to claim 13 wherein said fine aggregate comprises sand.

15. The method according to claim 6, wherein a coarse aggregate is added together with said fine aggregate.

16. The method according to claim 15 wherein after incorporation of said fine and coarse aggregates, the resulting mixture is kneaded and then secondary water is added.

* * * * *